(12) United States Patent
Luce

(10) Patent No.: US 7,724,842 B2
(45) Date of Patent: May 25, 2010

(54) SYSTEM AND METHOD FOR EVM SELF-TEST

(75) Inventor: Lawrence B. Luce, Sun Lakes, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 957 days.

(21) Appl. No.: 11/476,966

(22) Filed: Jun. 27, 2006

(65) Prior Publication Data

US 2007/0297537 A1    Dec. 27, 2007

(51) Int. Cl.
*H03D 3/00* (2006.01)
(52) U.S. Cl. .................. 375/322; 375/316; 375/324; 375/340
(58) Field of Classification Search .......... 375/316, 375/322, 340, 346
See application file for complete search history.

(56) References Cited

U.S. PATENT DOCUMENTS 5,621,767 A *   4/1997   Brandt et al. ............ 375/344
7,016,401 B1 *  3/2006   Smith et al. .............. 375/222
7,020,070 B2 *  3/2006   Lindoff .................... 370/206
7,397,871 B2 *  7/2008   Wiss et al. ............... 375/340
7,489,660 B2 *  2/2009   Min ........................ 370/332
2005/0200507 A1  9/2005  Premy
2006/0215744 A1* 9/2006  O'Neill .................... 375/224
2007/0070881 A1* 3/2007  Olgaard et al. ........... 370/208

* cited by examiner

*Primary Examiner*—David C Payne
*Assistant Examiner*—Leon Flores
(74) *Attorney, Agent, or Firm*—Ingrassia, Fisher & Lorenz, P.C.

(57) ABSTRACT

A system and method for EVM self-testing a communication device is provided including receiving (305) a complex waveform, sampling (310) first and second sample voltages from the complex waveform, selecting (315) first and second ideal voltages from I- and Q-arrays, and determining (320) an error vector by comparing the first and second sample voltages with the first and second ideal voltages for a desired number of comparisons (N). The first ideal voltage corresponds with the first sample voltage, the second ideal voltage corresponds with the second sample voltage, and the I- and Q-arrays are derived from a conversion of a bitstream to the complex waveform.

16 Claims, 4 Drawing Sheets

SYSTEM AND METHOD FOR EVM SELF-TEST

FIELD OF THE INVENTION

The present invention generally relates to testing electronics devices, and more particularly relates to a system and method for determining the quality of electronics.

BACKGROUND OF THE INVENTION

An Error Vector Magnitude (EVM) test is a transmitter modulation quality metric for electronics such as communications (e.g., cellular, wireless local area network (WLAN), paging, and the like) electronics, such as embodied in integrated circuits (ICs), multi-chip modules, and chipsets. In general, the transmitted EVM is measured via a comparison of an input demodulated constellation point to an ideal constellation point, given a proscribed filtering, etc., and after error-compensation. The EVM test may be used to measure deviations of the output waveform voltage (e.g., of the IC, multi-chip module, chipset, etc.) from an ideal waveform at the exact data-slicer sample time and after equalization and signal conditioning has been performed. Using the measured deviations, modifications to the IC, multi-chip module, or chipset may be made to correct for such deviations. Additionally, such deviations may be used as a quality metric in regulator acceptance testing or, when compared to acceptance limits, for production pass/fail testing.

One concern is whether the EVM test results are representative of the actual deviations from ideal. The IC, multi-chip module, or chipset performs most of the demodulation and data slicing for demodulating a received signal using digital signal processing (DSP) techniques often utilizing fixed-point software or hardware filters and calculation blocks. Disparities in EVM test results may exist between EVM tests performed using test equipment external to the IC and the actual transmit modulation/receive demodulation quality of the transceiver IC or chipset. For example, external test systems use proprietary down-conversion, demodulation, and baseband signal extraction algorithms that are typically different from the fixed-point hardware down-conversion, demodulation, and baseband extraction algorithms performed by the communication IC. In some instances, the derived voltage using the test equipment may differ from the derived voltage produced by the communication IC. The actual deviation within the IC may be different from the deviation detected by the test equipment, and thus the EVM result may be non-indicative of the transceiver IC or chipset quality. Additionally, because the baseband signal extraction algorithms typically vary from one test equipment vendor to another (e.g., producing different EVM results), correlating results with customers using different EVM test equipment is a difficult process.

EVM tests may be used to evaluate the magnitude of deviations of the IC waveform voltage from the ideal waveform during production as an acceptance gate. For example, devices that pass the EVM test are deemed shippable product while those devices that fall short of the EVM test are recycled. From a production test time perspective, conventional EVM tests take a considerable amount of time which increases IC production costs. Much of this test time may be attributed to the fact that the conventional EVM test equipment first digitizes the transmitted signal and then post-processes the digitized signal to calculate the EVM.

Test system vendors typically develop EVM solutions on an as-needed basis. The proprietary algorithms of each Automatic Test Equipment (ATE) vendor are typically individually developed as the need arises, and these algorithms often take several months to develop and several more months to correlate. This development and correlation time often adversely impacts production delivery schedules. For example, delivery of the EVM test results can take about four (4) to six (6) months and then take a few more months for correlation and prove-in. Conducting EVM tests in a production environment is generally a time consuming and costly process. Volume EVM testing is typically not available early enough in a device design cycle to permit design fixes based upon the EVM results. Additionally, the test system should be fully configured for modulated radio frequency (RF) source and measurement capabilities which is expensive to implement.

Accordingly, systems and methods for testing electronics are desired that provide a representative quality metric. More particularly, in some examples, systems and methods for EVM testing of ICs or chipsets are desired that provide a representative quality metric in real time. In addition, systems and methods for testing communication electronics are desired that provide a representative quality metric while reducing correlation difficulties. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description.

According to various embodiments, systems and methods are provided for self-determining the modulation quality of electronic devices. The system comprises a design-for-test (DFT) module that is incorporated with a receiver and transmitter pair or with a functionally combined transceiver unit. The receiver and transmitter pair or transceiver may be used in a variety of electronic devices, such as cellular phones, cordless phones, digital radios, wireless local area networks (WLAN) devices, wireless personal area networks (WPAN) devices (e.g., personal digital assistants, digital cameras, laptops, personal computers, printers, etc.), and the like. In one exemplary embodiment, the system performs Error Vector Magnitude (EVM) self-testing via the DFT module and thereby may obviate the use of external test equipment to determine the modulation quality. Although a receiver and transmitter are described hereinafter with regard to corresponding hardware that accomplishes signal processing functions, the receiver and transmitter may alternatively utilize software, such as found in software defined radios, that encompass applications, routines, or other software modules to accomplish one or more of the signal processing functions. Those of skill in the relevant art will appreciate that other variations of hardware, software, or any combination thereof may be implemented to accomplish the same functions.

Figure 1:
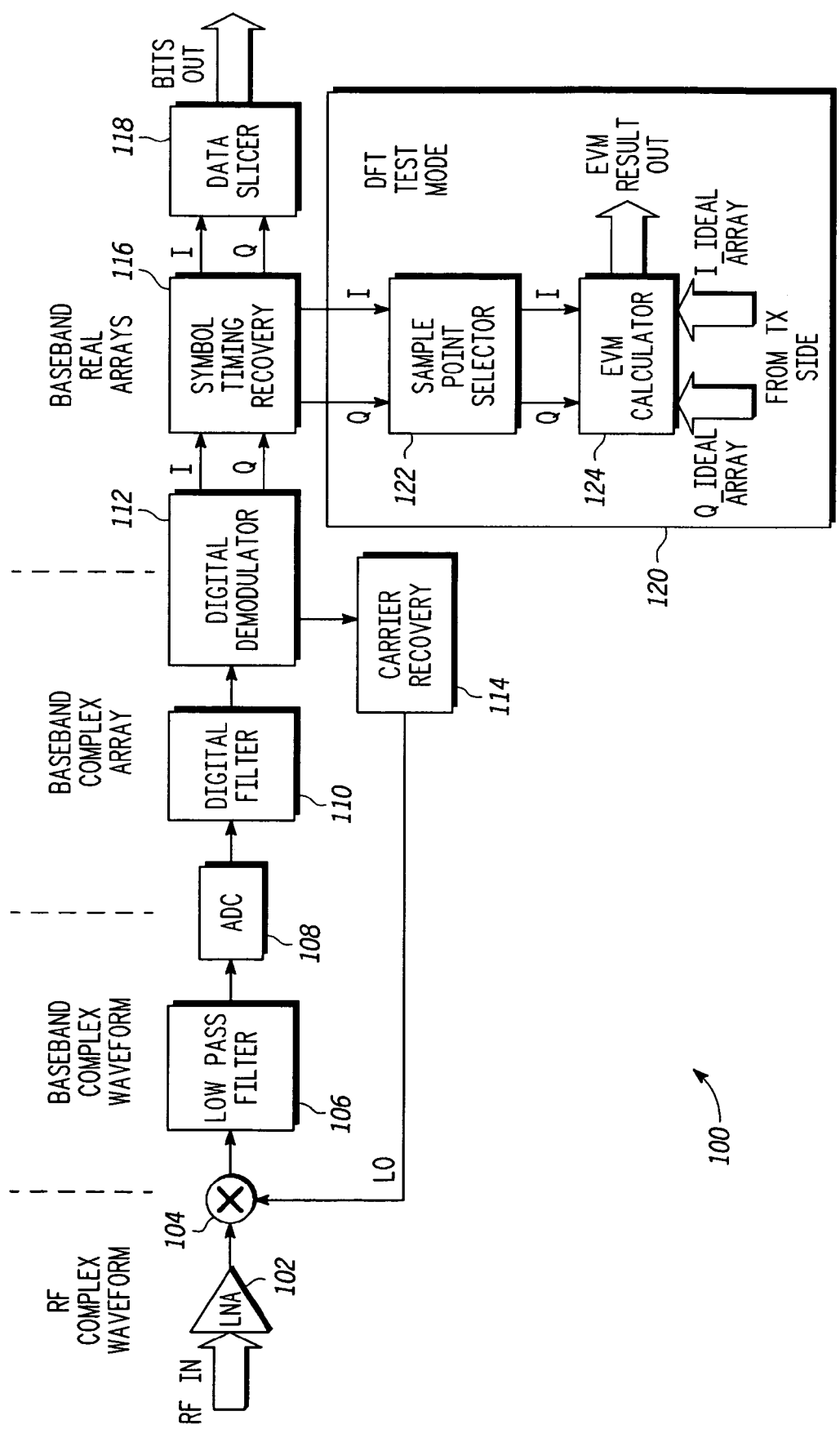
FIG. 1 is a block diagram of a receiver having a design-for-test module in accordance with an exemplary embodiment of the present invention.

Referring to the drawings, FIG. 1 is a block diagram of a receiver 100 having a DFT module 120 in accordance with an exemplary embodiment of the present invention. Receiver 100 may be a separate communication device (e.g., a receiver integrated circuit (IC)) paired with a transmitter (e.g., a transmitter IC) or be incorporated as a receiver portion within a transceiver. Receiver 100 comprises a low noise amplifier (LNA) 102, a mixer 104 having a first input coupled to an output of LNA 102, a low pass filter 106 having an input coupled to an output of mixer 104, an analog-to-digital converter (ADC) 108 having an input coupled to an output of low pass filter 106, a digital filter 110 having an input coupled to an output of ADC 108, a digital demodulator 112 having an input coupled to an output of digital filter 110, a carrier recovery unit 114 having an input coupled to a first output of digital demodulator 112 and having an output coupled to a second input of mixer 104, a symbol timing recovery module 116 having an input coupled to a second output of digital demodulator 112, a data slicer 118 having an input coupled to a first output of symbol timing recovery module 116, and DFT module 120 having a first input coupled to a second output of symbol timing recovery module 116. Receiver 100 has a test mode for operating DFT module 120 and a normal operation mode and may include additional signal processing elements that perform further signal processing/analysis of the data (e.g., bits) output from data slicer 118 during normal operation mode. Although receiver 100 is described in one exemplary configuration, receiver 100 may also take other configurations such as a reverse version of a transmitter. For example, the output of LNA 102 may be split to feed two mixers with in-phase (I-) and quadrature phase (Q-) local oscillator (LO) phases that feed two filters and in turn feed two ADCs. In this example, the outputs of these two ADCs together feed a digital demodulator.

A modulated RF signal is received by receiver 100 via an input of LNA 102. LNA 102 ranges the modulated RF signal for further signal processing in receiver 100. For example, LNA 102 can direct the modulated RF signal directly to mixer 104, apply attenuation to the modulated RF signal, or apply gain to the modulated RF signal. Mixer 104 down-converts the modulated RF signal by time-domain multiplication against a LO frequency. In this exemplary embodiment, the LO frequency is supplied to mixer 104 by carrier recovery unit 114. Mixer 104 outputs sums and differences of all integer multiples of the modulated RF signal and the LO frequency, and low pass filter 106 selects the fundamental difference to down-convert the RF complex waveform to a baseband complex waveform. ADC 108 digitizes the baseband complex waveform into a baseband complex array, and digital filter 110 filters the baseband complex array. Digital demodulator 112 converts the baseband complex array into I- and Q-components and supplies the I- and Q-components to symbol timing recovery module 116. Symbol timing recovery module 116 produces time-aligned I- and Q-voltage arrays, and data slicer 118 samples the time aligned I- and Q-voltage arrays to determine the corresponding bit combination (e.g., symbol) and outputs the symbol. Carrier recovery unit 114 performs digital or analog signal processing to obtain the appropriate LO frequency from the baseband complex array.

DFT module 120 comprises a sample point selector 122, and an EVM calculator unit 124 coupled to sample point selector 122. During the test mode of receiver 100, sample point selector 122 samples from the I- and Q-voltage arrays, and EVM calculator unit 124 determines any deviations of the samples from appropriate (e.g., ideal) transmitted voltages at the selected comparison points. In an exemplary embodiment, the ideal selected sample point voltages are preferably selected from I- and Q-ideal arrays (e.g., the I- and Q-voltage arrays utilized by the transmitter such as when supplied to digital-to-analog converters (DACs) of the transmitter). For example, DFT module 120 has a second input for receiving the I- and Q-ideal arrays from the transmitter. Using these I- and Q-ideal arrays to determine the ideal selected sample point voltages avoids accounting for unknown carrier rotations or symbol timings that are traditionally associated with the use of an external test system. The array indices of the ideal sample selection points are known a-priori from the transmitter side. In an alternative embodiment, a Nearest Ideal Constellation Point (NICP) technique may be applied by sample point selector 122 to determine the appropriate transmitted voltages. The transceiver embodiment shares EVM calculation resources and decreases loading on the internal processing of the transceiver by reducing the calculation of comparison voltages for the EVM test mode. EVM calculator unit 124 outputs the EVM test results (e.g., deviations of the voltage waveform from ideal).

Figure 2:
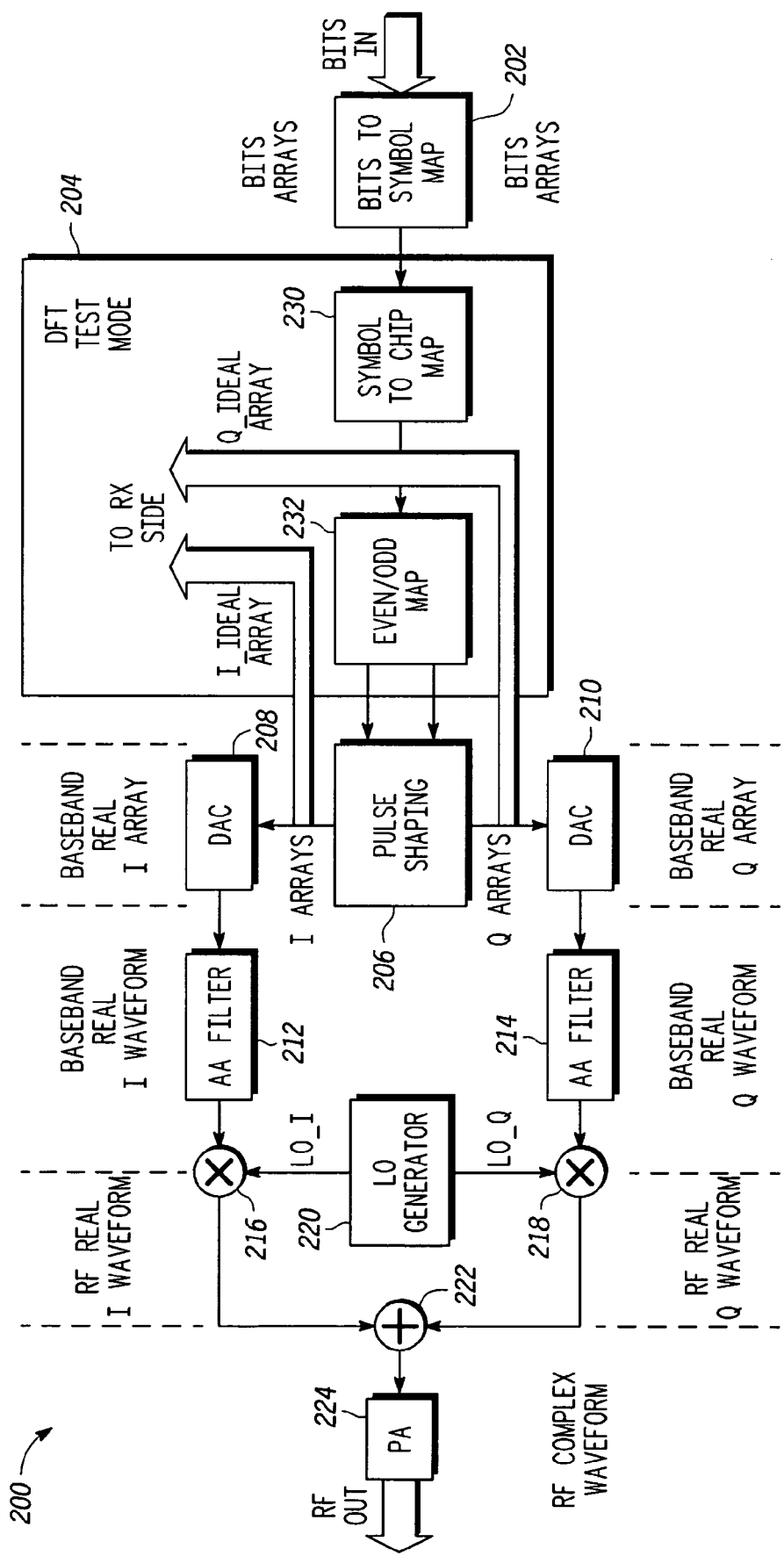
FIG. 2 is a block diagram of a transmitter having a design-for-test module in accordance with an exemplary embodiment of the present invention.

FIG. 2 is a block diagram of a transmitter 200 having a DFT module 204 in accordance with an exemplary embodiment of the present invention. Transmitter 200 comprises a first mapping unit 202, a second mapping unit 230 having an input coupled to an output of first mapping unit 202, a third mapping unit 232 having an input coupled to an output of second mapping unit 230, a pulse shaping unit 206 having an input coupled to an output of mapping unit 232, digital-to-analog converters (DACs) 208 and 210 having inputs coupled to an output of pulse shaping unit 206, filters 212 and 214 having inputs coupled to outputs of DACs 208 and 210, respectively, mixers 216 and 218 having first inputs coupled to filters 212 and 214, respectively, a local oscillator (LO) 220 having outputs coupled to second inputs of mixers 216 and 218, summing unit 222 having a first input coupled to an output of mixer 216 and a second input coupled to an output of mixer 218, and a power amplifier (PA) 224 having an input coupled to an output of summing unit 222. Pulse shaping unit 206 is a more specialized filter and other filters may be used in place of pulse shaping unit 206. DFT module 204 determines the ideal I-voltage array and Q-voltage array and supplies these ideal arrays to a receiver paired with transmitter 200, such as receiver 100 shown in FIG. 1, or the receiver portion of a transceiver incorporating transmitter 200. Although transmitter 200 utilizes mapping units 202, 230, and 232, the mapping units may be omitted depending on the particular modulation format of transmitter 200 (e.g., mapping units are used for code division multiple access (CDMA)/wideband CDMA (WCDMA) or other spread spectrum modulation formats).

Transmitter 200 receives data (e.g., in the form of a bit stream) via an input of mapping unit 202, and mapping unit 202 maps the bits to corresponding symbols (e.g., four (4) bits to a corresponding symbol). Mapping unit 230 maps the symbols to a chip sequence (e.g., a thirty-two (32) chip sequence), and mapping unit 232 maps the chip sequences to corresponding odd or even chip streams. Pulse shaping unit 206 receives the chip streams and converts the chip streams to baseband real I- and Q-arrays. DACs 208 and 210 convert the baseband real I- and Q-arrays to a baseband real I- and Q-waveforms, respectively. The DAC 208 and 210 outputs are anti-alias filtered by filters 212 and 214, respectively, and up-converted by mixers 216 and 218, respectively, to RF real I- and Q-waveforms using quadrature phases LO_I and LO_Q, respectively, of the carrier frequency LO of the channel in use. The RF real I- and Q-waveforms are combined by summing unit 222 to produce an RF complex waveform and amplified by PA 224 for transmission. Transmitter 200 may take a variety of configurations, such as varied based on the type of modulation standard. For example, mapping unit 230 may be omitted when modulation standards or communication methods are used in transmitter 200 that lack the appropriate spreading techniques. Pulse shaping unit 206 may also be omitted depending on the requirements of the particular modulation standard. Transmitter 200 and receiver 100, shown in FIG. 1, may have other configurations.

Some time delay may occur during the process of modulating-transmitting-looping back-receiving-demodulating and with filter 110, and a correlation determination may be made by DFT modules 120 or 204 such that the ideal voltages are appropriately time-aligned to the received selected sample voltages for the EVM calculation. In an IC configuration, the on-chip delays and off-chip delays may alternatively be accounted for using a pre-determined parameter that takes into consideration both the calculated (or simulated) on-chip delays and the characterized delay of the loop back path (e.g., from transmitter 200 to receiver 100). For example, this parameter is supplied to and/or stored in memory accessible by the receiver IC or transceiver IC and utilized during EVM calculation to offset on-chip and/or off-chip delays.

Figure 3:
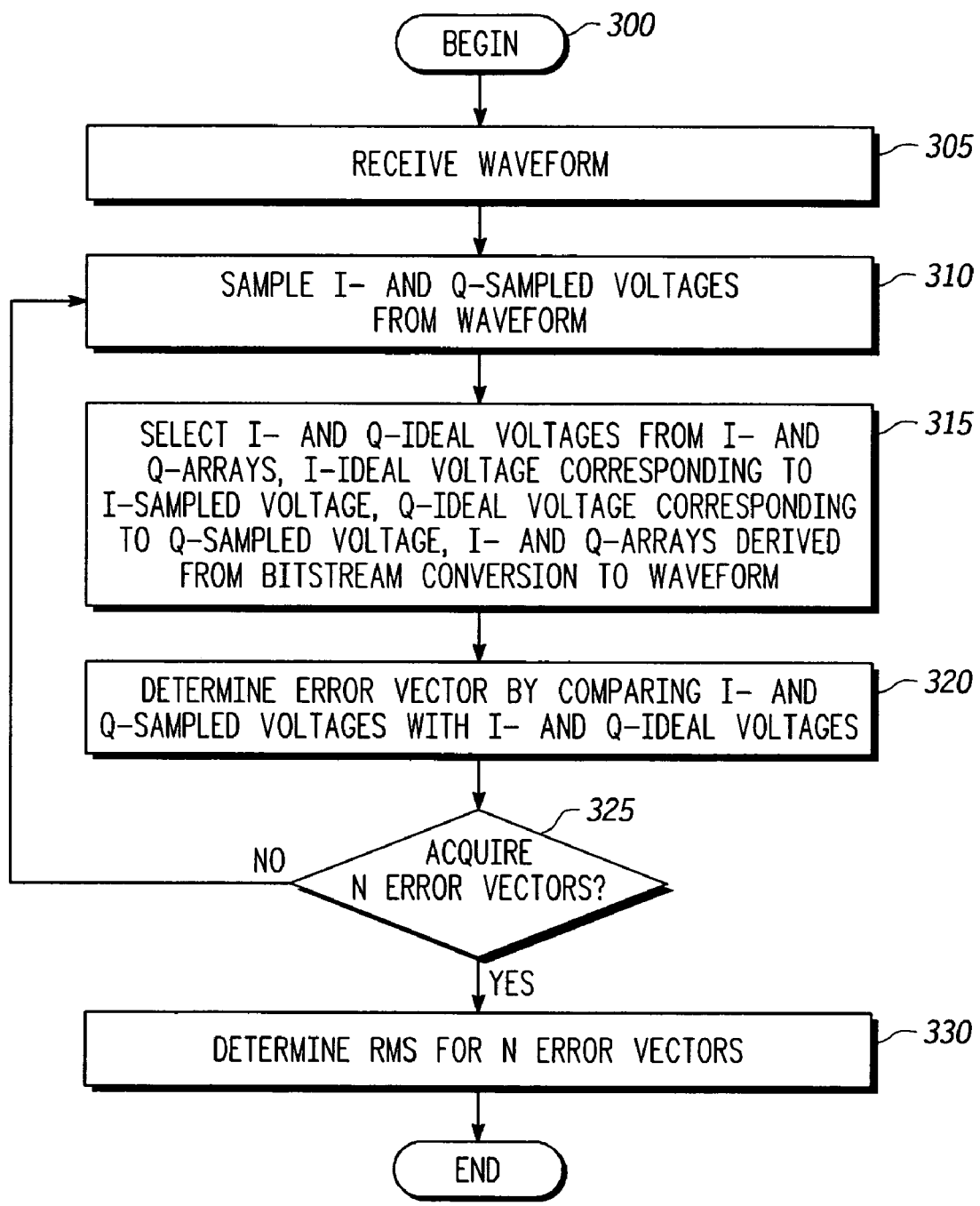
FIG. 3 is a flow diagram of a method for testing an electronic device in accordance with an exemplary embodiment of the present invention.

FIG. 3 is a flow diagram of a method 300 for testing an electronic device in accordance with an exemplary embodiment of the present invention. An RF complex waveform is received as shown at step 305. In one exemplary embodiment, the electronic device comprises a transmitter portion (e.g., transmitter 200) configured to transmit the RF complex waveform, and the complex waveform is received by a receiver portion (e.g., receiver 100) from the transmitter portion. The transmitter portion is further configured to produce I- and Q-arrays from a bitstream while converting the bitstream to the RF complex waveform. For example, mapping unit 202 maps the bits from a bitstream to corresponding symbols, mapping unit 230 maps the symbols to a chip sequence, mapping unit 232 maps the chip sequences to corresponding odd or even chip streams, and pulse shaping unit 206 (or another filter) converts the chip streams to baseband real I- and Q-arrays.

I- and Q-sample voltages are sampled from the RF complex waveform as shown at step 310. For example, a sample point of the RF complex waveform is selected by sample point selector 122 after down-conversion, demodulation, and other signal conditioning of the RF complex waveform, and the selected sample point is a voltage vector represented by the I- and the Q-sample voltage components. In one exemplary embodiment, the RF complex waveform is down-converted to a baseband complex waveform (e.g., via mixer 104), the baseband complex waveform is digitized to a baseband complex array (e.g., via ADC 108), and baseband real arrays (e.g., time-aligned I- and Q-sample arrays) are produced from the baseband complex array (e.g., via digital demodulator 112). In another exemplary embodiment, the RF complex waveform is down-converted to a baseband complex waveform, the baseband complex waveform is digitized to a baseband complex array, the baseband complex array is demodulated to produce time-aligned I- and Q-voltage arrays, and at least one symbol is determined from the time-aligned I- and Q-voltage arrays (e.g., via symbol timing recovery module 116). The baseband complex waveform is low-pass filtered (e.g., via low pass filter 106) prior to digitizing, and the baseband complex array is digitally filtered (e.g., via digital filter 110) prior to demodulating.

The I-sample voltage is selected from the I-sample array at an array index corresponding with the selected sample point, and the Q-sample voltage is selected from the Q-sample array at the same array index. I- and Q-ideal voltages are selected from I- and Q-arrays as shown at step 315. For example, the I- and Q-arrays may be received from the transmitter portion by DFT test module 120 and EVM calculator 124 selects the I- and Q-ideal voltages for these arrays. The I-ideal voltage corresponds with the I-sampled voltage, the Q-ideal voltage corresponds with the Q-sampled voltage. For example, the selected sample point corresponds with a point on the originally transmitted waveform, and this point on the originally transmitted waveform is a voltage vector represented by the I- and Q-ideal voltage components. The I- and Q-ideal voltages may be time-aligned with the I- and Q-sample voltages.

An error vector is determined by comparing the I- and Q-sampled voltages with the I- and Q-ideal voltages as shown at step 320. For example, EVM calculator 124 compares the sample point, represented by the I- and Q-sampled voltages, with the corresponding ideal point, represented by the I- and Q-ideal voltages. A determination is made (e.g., by DFT test module 120) whether a pre-determined number, N, error vectors have been calculated as shown at step 325. In the event that N error vectors have not been calculated, an additional sample is made (e.g., additional I- and Q-sampled voltages) of the received RF complex waveform at step 310. For example, steps 310, 315, and 320 are repeated until N error vectors have been produced. In the event N error vectors have been produced, a root mean square (RMS) is determined from the N error vectors at step 330. The RMS represents the EVM test result and may be determined external to the electronic device (e.g., by a processor (not shown)) and utilized to indicate whether the electronic device satisfies design criteria in real time (e.g., during device production).

Figure 4:
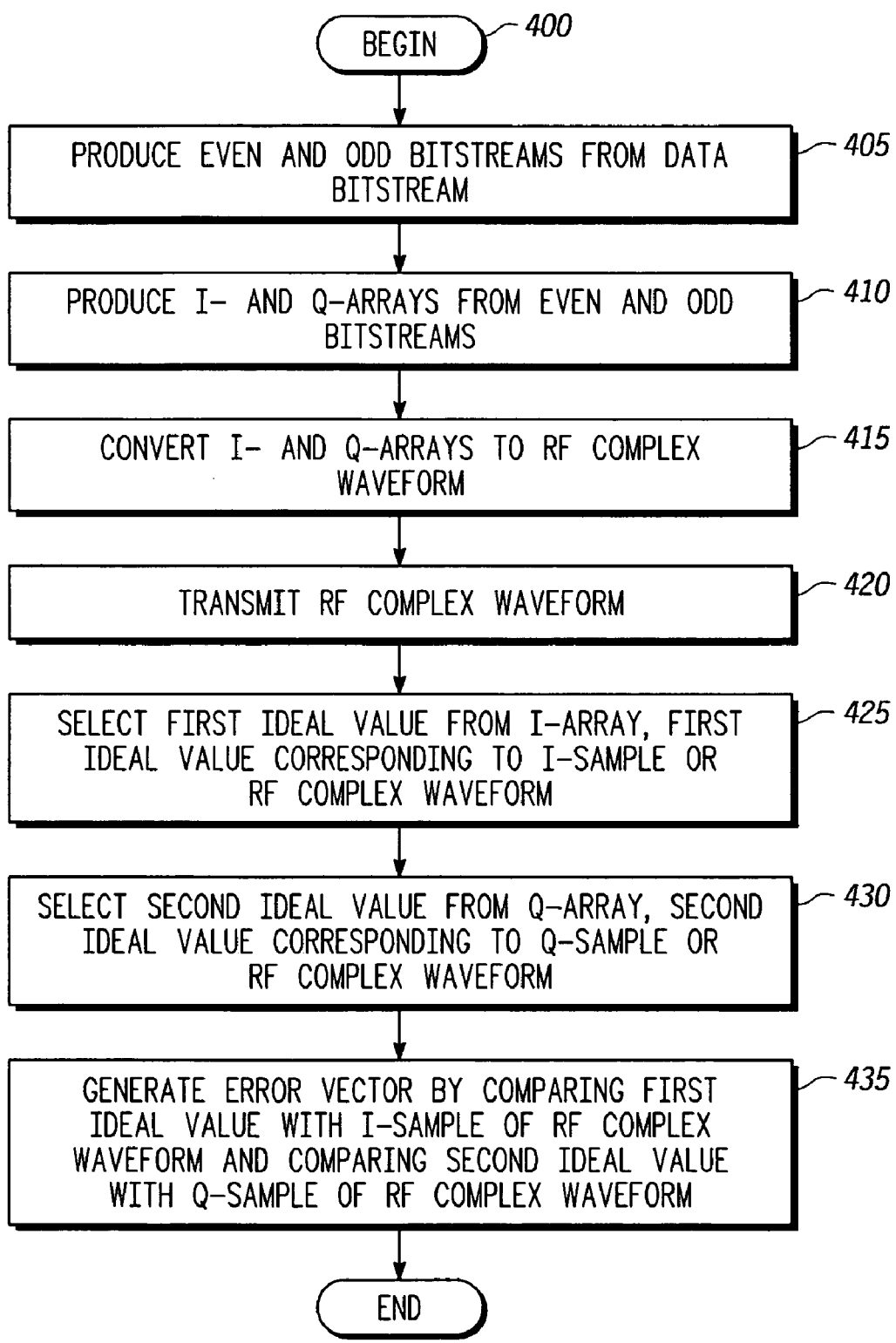
FIG. 4 is a flow diagram of a method for testing an electronic device in accordance with another exemplary embodiment of the present invention.

FIG. 4 is a flow diagram of a method 400 for testing an electronic device in accordance with another exemplary embodiment of the present invention. I- and Q-arrays are produced from a data bitstream while converting the data bitstream to an RF complex waveform, such as by transmitter 200. Even and odd bitstreams are produced from the data bitstream as shown at step 405. For example, the data bitstream is mapped to at least one symbol by mapping unit 202, and even and odd bitstreams are produced from the at least one symbol by mapping unit 230. The I- and Q-arrays are produced from the even and odd bitstreams as shown at step 410. For example, the even and odd bitstreams may be pulse-shaped to produce the I- and Q-arrays via pulse shaping unit 206. The I- and Q-arrays are converted to an RF complex waveform as shown at step 415. In one exemplary embodiment, the I- and Q-arrays are converted to I- and Q-baseband waveforms by DACs 208 and 210, the I- and Q-baseband waveforms are up-converted to I- and Q-RF waveforms by mixers 216 and 218, and the I- and Q-RF waveforms are combined to produce the RF complex waveform by summing unit 222. The I- and Q-baseband waveforms may be anti-alias filtered prior to up-conversion. The RF complex waveform is transmitted as shown at step 420. The RF complex waveform may be amplified prior to transmission by PA 224. An I-ideal value is selected from the I-array corresponding to an I-sample of the RF complex waveform at as shown step 425. A Q-ideal value is selected from the Q-array corresponding to a Q-sample of the RF complex waveform as shown at step 430. For example, EVM calculator 124 may select the I- and Q-ideal values from the I- and Q-arrays, respectively. An error vector is generated by comparing the I- and Q-ideal values with the I- and Q-samples of the RF complex waveform. The steps 425, 430, and 435 are repeated to produce a predetermined number, N, of error vectors. A root mean square (RMS) is determined from the N error vectors. In an exemplary embodiment, the electronic device comprises a receiver portion (e.g., receiver 100) configured to receive the RF complex waveform and further configured to select the I- and Q-samples of the RF complex waveform. In this exemplary embodiment the I- and Q-arrays are transmitted (e.g., via transmitter 200) to the receiver portion prior to steps 425 and 430.

A communication system incorporating receiver 100 and transmitter 200, either as individual units (e.g., individual ICs in a chipset) or in a combined transceiver (e.g., a transceiver IC), may obviate the development time associated with external test equipment used to conduct EVM testing. By comparing appropriate points in the bit arrays of the original transmitted RF signal (e.g., obtained from the I- and Q-arrays produced by the transmitter 200) with the sampled points of the received RF signal (e.g., the same voltages are used by the data slicer), a representative quality metric is derived. Utilizing the receiver device of a chipset, or the receiver side of a transceiver chip, to process the signal in real time incurs a relatively short processing delay, thereby adding a relatively small processing overhead for the EVM calculation to the receiver results in an overall test time reduction. Additionally, the EVM self-test may be conducted during a test mode in real time thus lowering production test time costs. The EVM results may be available as soon as the device (e.g., chipset) is functional, and thus the quality results for a lot may be readily used in design iterations. Less expensive tester hardware configurations may also be utilized by internally performing the modulated RF waveform source and measurement in receiver 100 and transmitter 200. In one exemplary embodiment, the transmit signal generations and the receive signal processing are performed by the actual transmitter device and receiver device, respectively, and thus the results directly reflect the quality of the ICs or chipset. Correlation difficulties in EVM test results are minimized or eliminated by utilizing the self-test module of the present invention which replaces external test equipment or systems normally associated with diverse algorithms.

In one exemplary embodiment, a method for testing an electronic device is provided comprising receiving a complex waveform, sampling first and second sample voltages from the complex waveform, selecting first and second ideal voltages from in-phase (I-) and quadrature phase (Q-) arrays, and determining an error vector by comparing the first and second sample voltages with the first and second ideal voltages. The first ideal voltage corresponds with the first sample voltage, the second ideal voltage corresponds with the second sample voltage, and the I- and Q-arrays are derived from a conversion of a bitstream to the complex waveform. The method further comprises repeating the sampling step, selecting step, and determining step to produce a pre-determined number of error vectors, and determining a root mean square (RMS) from the pre-determined number of the error vectors. The method further comprises, prior to the step of determining an error vector, time-aligning the first and second ideal voltages with the first and second sample voltages. The method further comprises, prior to the step of sampling, the steps of down-converting the complex waveform to a baseband waveform, digitizing the baseband waveform to a baseband array, and producing time-aligned I- and Q-sample arrays from the baseband array. In one exemplary embodiment, the step of sampling comprises sampling the first sample voltage from the I-sample array at an array index, and sampling the second sample voltage from the Q-sample array at the array index. In this exemplary embodiment, the method further comprises recovering a carrier from the baseband array, and determining a local oscillator (LO) frequency from the carrier. In this exemplary embodiment, the down-converting step comprises time-domain multiplying the complex waveform with the LO frequency. The communication device comprises a transmitter portion configured to produce the I- and Q-arrays from the bitstream while converting the bitstream to the complex waveform and further configured to transmit the complex waveform. In this exemplary embodiment, the receiving step comprises receiving the complex waveform from the transmitter portion, and the method further comprises receiving the I- and Q-arrays from the transmitter portion. In an exemplary embodiment, the method further comprises down-converting the complex waveform to a baseband waveform, digitizing the baseband waveform to a baseband array, demodulating the baseband array to produce time-aligned I- and Q-voltage arrays, and determining at least one symbol from the time-aligned I- and Q-voltage arrays. In this exemplary embodiment, the method further comprises, prior to the digitizing step, low-pass filtering the baseband waveform, and, prior to the demodulating step, digitally filtering the baseband array. In another exemplary embodiment, the method is performed by a receiver.

In another exemplary embodiment, a method for testing an electronic device is provided comprising producing in-phase (I-) and quadrature phase (Q-) arrays from a data bitstream while converting the data bitstream to a radio frequency (RF) complex waveform, transmitting the RF complex waveform, selecting a first ideal value from the I-array, selecting a second ideal value from the Q-array, and generating an error vector by comparing the first and second ideal values with the I- and Q-samples of a baseband complex waveform associated with the RF complex waveform. The first ideal value corresponds to an I-sample of the baseband complex waveform, and the second ideal value corresponds to a Q-sample of the baseband complex waveform. The method further comprises repeating the steps of selecting a first ideal value, selecting a second ideal value, and generating an error vector to produce a predetermined number of error vectors, and determining a root mean square (RMS) from the pre-determined number of the error vectors. In an exemplary embodiment, the step of producing I- and Q-arrays comprises converting the I- and Q-arrays to I- and Q-baseband waveforms, up-converting the I- and Q-baseband waveforms to I- and Q-RF waveforms, and combining the I- and Q-RF waveforms to produce the RF complex waveform. In this exemplary embodiment, the step of producing I- and Q-arrays comprises mapping the data bitstream to at least one symbol, producing even and odd bitstreams from the at least one symbol, and filtering the even and odd bitstreams to produce the I- and Q-array. In this exemplary embodiment, the method further comprises, prior to the step of up-converting, anti-alias filtering the I- and Q-baseband waveforms. The method further comprises, prior to the step of transmitting, amplifying the RF complex waveform. The communication device comprises a receiver portion configured to receive the RF complex waveform and further configured to select the I- and Q-samples of the RF complex waveform, and the method further comprises, prior to the step of selecting a first ideal value, transmitting the I- and Q-arrays to the receiver portion.

In another exemplary embodiment, a self-testing system is provided comprising a receiver portion configured to receive an RF signal and further configured to produce I- and Q-voltage arrays from the RF signal. The receiver comprises a test module configured to receive in-phase (I-) and quadrature-phase (Q-) ideal arrays and further configured to determine an error vector magnitude (EVM) from I- and Q-ideal arrays and the I- and Q-voltage arrays. The test module is further configured to time-align the first and second ideal values with the first and second sample values. The test module comprises a sampling unit configured to select first and second sample values from the I- and Q-voltage arrays, and an EVM calculator configured to determine first and second ideal values of the I- and Q-ideal arrays corresponding to the first and second sample values and compare the first and second sample values with the first and second ideal values to determine the EVM. The self-testing system further comprises a transmitter portion coupled to the test module and configured to produce the RF signal from I- and Q-ideal arrays and further configured to transmit the RF signal to the receiver portion. The transmitter portion comprises a transmit-only integrated circuit (IC), and the receiver portion comprises a receive-only IC. In another exemplary embodiment, the self-testing system comprises an IC having the transmitter portion and the receiver portion.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for testing an electronic device that includes a transmitter portion and a receiver portion, the method performed by the electronic device and comprising the steps of:
    the transmitter portion producing in-phase (I-) and quadrature phase (Q-) arrays from a bitstream;
    the transmitter portion providing the I- and Q-arrays to the receiver portion;
    the transmitter portion converting the bitstream to a complex waveform;
    the transmitter portion transmitting the complex waveform;
    the receiver portion receiving the complex waveform that was transmitted by the transmitter portion;
    the receiver portion sampling an I-sample voltage and a Q-sample voltage from the complex waveform;
    the receiver portion receiving the I- and Q-arrays from the transmitter portion;
    the receiver portion selecting an I-ideal voltage from the I-array, and selecting a Q-ideal voltage from the Q-array, the I-ideal voltage being selected to be time-aligned with the I-sample voltage, the Q-ideal voltage being selected to be time-aligned with the Q-sample voltage;
    determining an error vector by comparing the I- and Q-sample voltages with the I- and Q-ideal voltages;
    repeating the producing, providing, converting, transmitting, receiving, sampling, selecting, and determining steps to produce a plurality of error vectors; and
    determining a root mean square (RMS) from the plurality of the error vectors.

2. A method according to claim 1 further comprising prior to said step of sampling, the steps of:
    down-converting the complex waveform to a baseband waveform;
    digitizing the baseband waveform to a baseband array; and
    producing time-aligned I- and Q-sample arrays from the baseband array.

3. A method according to claim 2, wherein said step of sampling comprises:
    sampling the I-sample voltage from the I-sample array at an array index; and
    sampling the Q-sample voltage from the Q-sample array at the array index.

4. A method according to claim 2 further comprising:
    recovering a carrier from the baseband array; and
    determining a local oscillator (LO) frequency from the carrier; and
    wherein said down-converting step comprises time-domain multiplying the complex waveform with the LO frequency.

5. A method according to claim 1 further comprising:
    down-converting the complex waveform to a baseband waveform;
    digitizing the baseband waveform to a baseband array;
    demodulating the baseband array to produce time-aligned I- and Q-voltage arrays; and
    determining at least one symbol from the time-aligned I- and Q-voltage arrays.

6. A method according to claim 5 further comprising:
    filtering the baseband waveform prior to said digitizing step low-pass; and
    digitally filtering the baseband array prior to said demodulating step.

7. A method for testing an electronic device that includes a transmitter portion and a receiver portion, the method performed by the electronic device and comprising the steps of:
    the transmitter portion producing in-phase (I-) and quadrature phase (Q-) arrays from a data bitstream while converting the data bitstream to a radio frequency (RF) complex waveform;
    the transmitter portion transmitting the RF complex waveform, the RF complex waveform associated with a baseband complex waveform;
    the receiver portion receiving the RF complex waveform that was transmitted by the transmitter portion;
    the receiver portion sampling an I-sample and a Q-sample from a version of the baseband complex waveform that is reconstructed from the RF complex waveform;
    the receiver portion selecting a first ideal value from the I-array, the first ideal value being selected to be time-aligned with an I-sample of the baseband complex waveform;
    the receiver portion selecting a second ideal value from the Q-array, the second ideal value being selected to be time-aligned with a Q-sample of the baseband complex waveform;
    the receiver portion generating an error vector by comparing the first and second ideal values with the I- and Q-samples of the baseband complex waveform;
    repeating said steps of producing the I- and Q-arrays, transmitting the RF complex waveform, receiving the RF complex waveform, sampling the I-sample and the Q-sample, selecting a first ideal value, said step of selecting a second ideal value, and said step of generating an error vector to produce a predetermined number of error vectors; and determining a root mean square (RMS) from the pre-determined number of the error vectors.

8. A method according to claim 7, wherein said step of producing I- and Q-arrays comprises:

converting the I- and Q-arrays to I- and Q-baseband waveforms;

up-converting the I- and Q-baseband waveforms to I- and Q-RF waveforms; and combining the I- and Q-RF waveforms to produce the RF complex waveform.

9. A method according to claim 8 further comprising prior to said step of up-converting, anti-alias filtering the I- and Q-baseband waveforms.

10. A method according to claim 7, wherein said step of producing I- and Q-arrays comprises:

mapping the data bitstream to at least one symbol;

producing even and odd bitstreams from the at least one symbol; and filtering the even and odd bitstreams to produce the I- and Q-arrays.

11. A method according to claim 7 further comprising prior to said step of transmitting, amplifying the RF complex waveform.

12. An electronic device comprising:

a transmitter portion configured to produce in-phase (I-) and quadrature phase (Q-) ideal arrays from a bitstream, to convert the bitstream to a complex waveform, and to transmit the complex waveform in the form of a radio frequency (RF) signal;

a receiver portion coupled to the transmitter portion and configured to receive the RF signal and further configured to produce I- and Q-voltage arrays from said RF signal, said receiver comprising a test module configured to determine an error vector magnitude (EVM) from said I- and Q-ideal arrays and said I- and Q-voltage arrays by comparing a voltage from the I-voltage array with a time-aligned voltage selected from the I-ideal array, and by comparing a voltage from the Q-voltage array with a time-aligned voltage selected from the Q-ideal array, wherein the receiver portion is further configured to receive additional RF signals, produce the I- and Q-voltage arrays for the additional received RF signals, and determine additional EVMs for the additional received RF signals, and to determine a root mean square (RMS) from the EVM and the additional EVMs.

13. A self-testing system comprising:

a receiver portion configured to receive a radio frequency (RF) signal and further configured to produce I- and Q-voltage arrays from said RF signal, said receiver comprising a test module configured to receive in-phase (I-) and quadrature-phase (Q-) ideal arrays and further configured to determine an error vector magnitude (EVM) from said I- and Q-ideal arrays and said I- and Q-voltage arrays, wherein said test module comprises:

a sampling unit configured to select first and second sample values from said I- and Q-voltage arrays; and an EVM calculator configured to:

determine first and second ideal values of said I- and Q-ideal arrays corresponding to said first and second sample values;

compare said first and second sample values with said first and second ideal values to determine said EVM;

repeating determining the first and second ideal values, and said step of comparing to determine said EVM in order to produce a predetermined number of EVMs; and determining a root mean square (RMS) from the pre-determined number of the EVMs.

14. A self-testing system according to claim 13 further comprising a transmitter portion coupled to said test module and configured to produce said RF signal from said I- and Q-ideal arrays and further configured to transmit said RF signal to said receiver.

15. A self-testing system according to claim 14, wherein said transmitter portion comprises a transmit-only integrated circuit (IC), and wherein said receiver portion comprises a receive-only IC.

16. A self-testing system according to claim 14 further comprising an IC having said transmitter portion and said receiver portion.

* * * * *